United States Patent [19]

Gaines

[11] 4,043,828

[45] Aug. 23, 1977

[54] SHRINKAGE INHIBITION OF CEMENTITIOUS SYSTEMS THROUGH THE ADDITION OF SPECIALLY PROCESSED CARBONACEOUS MATERIALS

[75] Inventor: Robert W. Gaines, Darien, Conn.

[73] Assignee: Construction Products Research, Inc., Old Greenwich, Conn.

[21] Appl. No.: 716,435

[22] Filed: Aug. 23, 1976

Related U.S. Application Data

[63] Continuation-in-part of Ser. No. 560,686, March 21, 1975, abandoned.

[51] Int. Cl.² .................................................. C04B 7/02
[52] U.S. Cl. ........................................ 106/97; 106/98; 106/104; 106/109; 106/110; 106/118; 106/314
[58] Field of Search ................... 106/97, 98, 104, 109, 106/110, 118, 314

[56] References Cited

U.S. PATENT DOCUMENTS

| | | | |
|---|---|---|---|
| 3,376,146 | 4/1968 | Mitchell | 106/97 |
| 3,503,767 | 3/1970 | Gaines et al. | 106/97 |
| 3,519,449 | 7/1970 | Babcock | 106/97 |
| 3,794,504 | 2/1974 | Babcock | 106/97 |

*Primary Examiner*—J. Poer
*Attorney, Agent, or Firm*—Alphonse R. Noe

[57] ABSTRACT

Naturally occurring particulate carbonaceous materials are rendered capable of counteracting or inhibiting shrinkage when added to cementitious systems by special processing including heat treatment at temperatures substantially higher than drying temperature. Further advantageous properties are obtained by contacting the material with a water spray at the heating temperature. The treatment enhances the properties of carbonaceous materials which are already capable of inhibiting shrinkage in the cementitious systems. Effective shrinkage inhibition is also obtained by adding particular amounts of anthracite coal to such a system containing aggregate. The compressive strength of the systems incorporating the shrinkage counteracting or inhibiting carbonaceous materials of this invention remains within acceptable limits when effective non-shrink properties are obtained.

15 Claims, 7 Drawing Figures

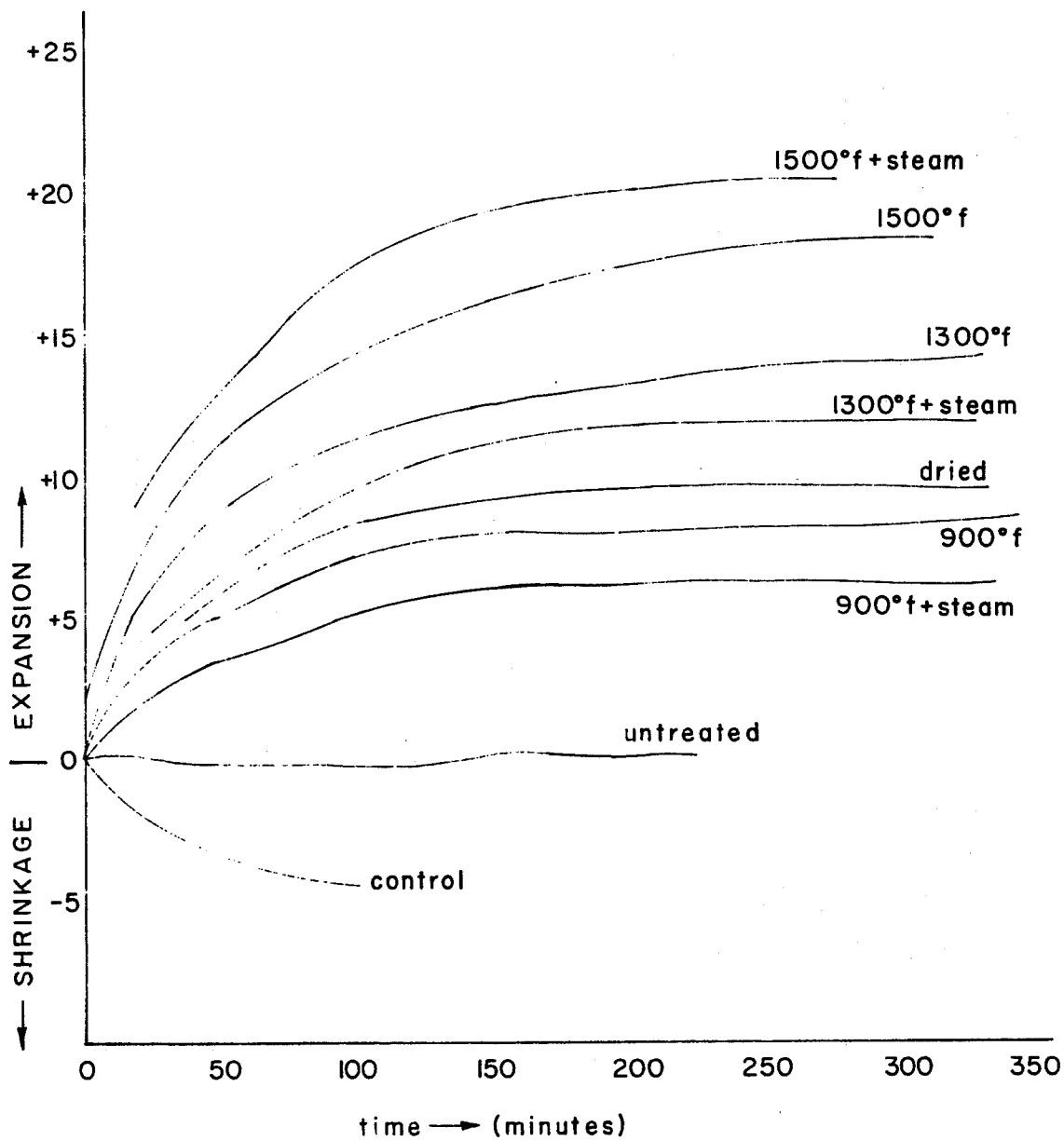
FIG.1 ANTHRACITE

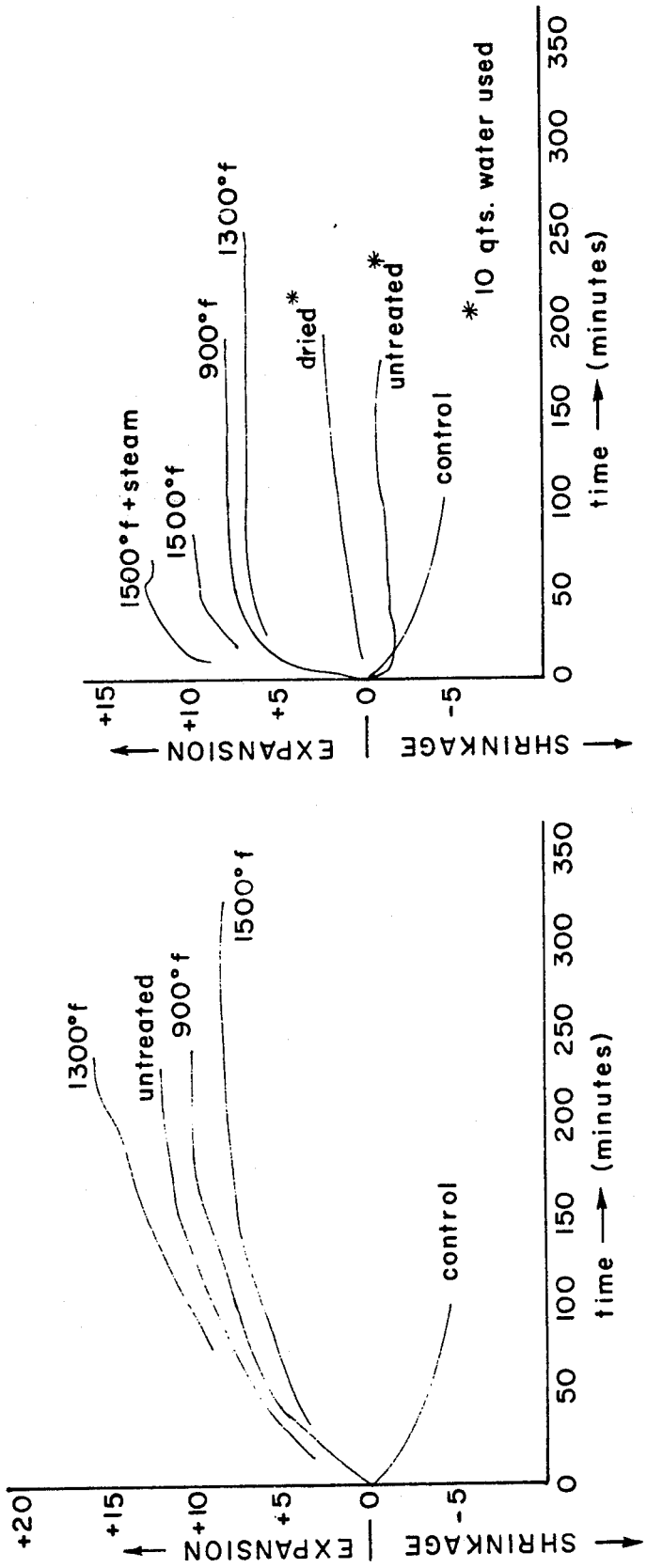
FIG. 2 LIGNITE
FIG. 3 FLUID COKE

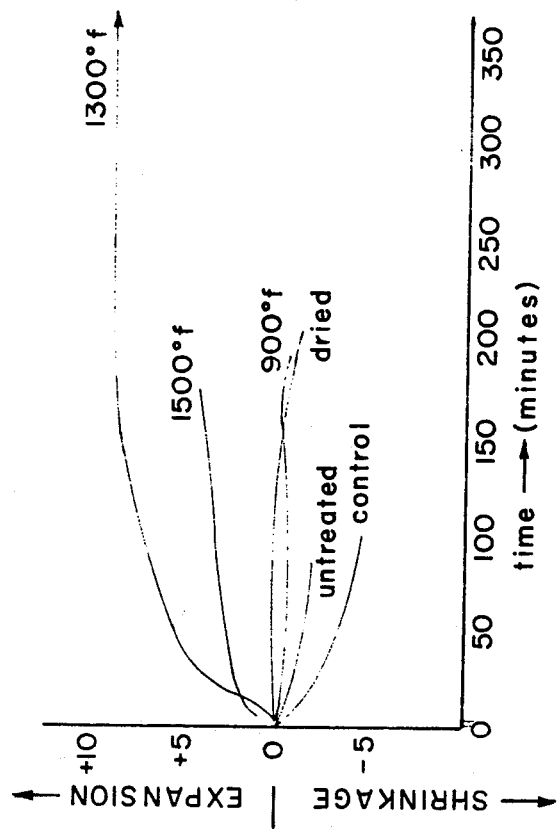
FIG. 4 DELAYED COKE
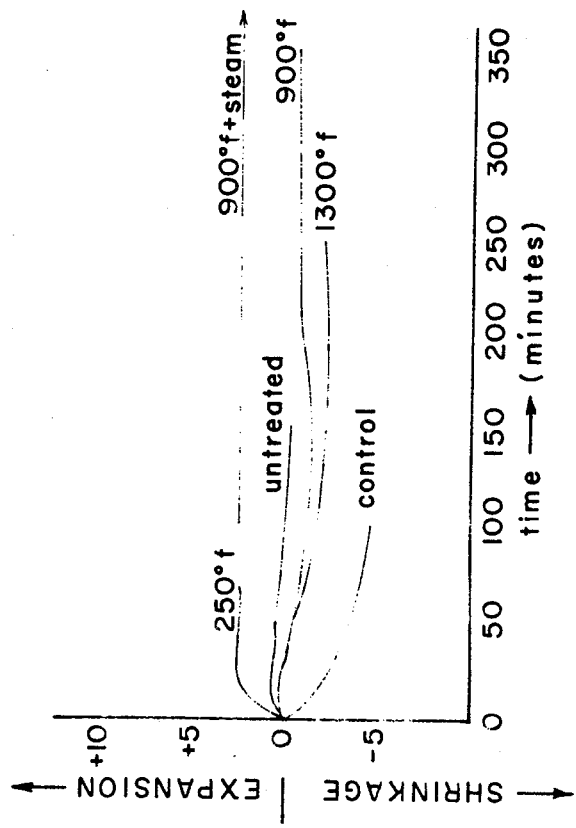
FIG. 5 ACTIVATED CARBON

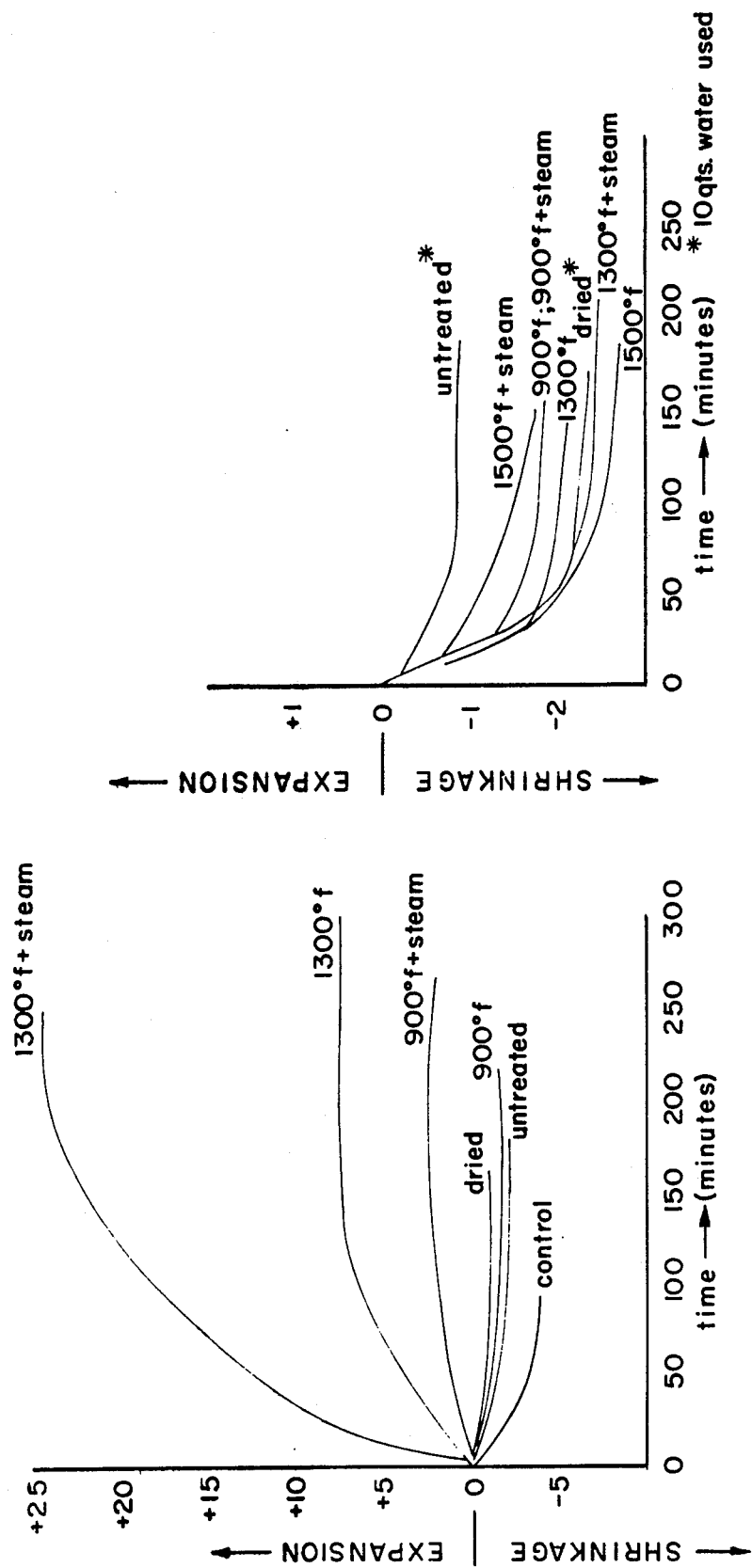

SHRINKAGE INHIBITION OF CEMENTITIOUS SYSTEMS THROUGH THE ADDITION OF SPECIALLY PROCESSED CARBONACEOUS MATERIALS

This application is a continuation-in-part application of my copending application Ser. No. 560,686 filed Mar. 21, 1975, now abandoned.

BACKGROUND OF THE INVENTION

1. Field of the Invention

This invention relates to an improved method and composition for counteracting and/or inhibiting shrinkage in cementitious systems during setting.

The term "cementitious systems", as used herein, is intended to include compositions which generally possess the characteristic of hardening under water and includes, for example, settable hydraulic cement, hydraulic lime, gypsum and like materials, as well as mixtures of the foregoing with aggregates and water such as concrete, mortar, grout and products made therefrom.

The terms "shrinkage inhibition" and "shrinkage counteraction" are used essentially interchangeably herein to describe, as a minimum, a reduction in the shrinkage of cementtitious systems and/or, advantageously, achieving a volume equal to or greater than the system placement volume, and encompass similar terms such as "shrinkage compensation" and "shrinkage elimination". The term "setting" is used broadly herein to generally describe the state of the cementitious system prior to the hardened state and encompass the plastic state.

2. Description of the Prior Art

Methods and means for inhibiting shrinkage of hydraulic cement mixtures during setting and hardening have previously been suggested. The prior art methods have included the addition, to such mixtures, of various expansion agents, such as aluminum powder and iron filings, which are generally added at the mixing during the preparation of the cement mixture. These procedures have been impractical because of, among other reasons, lack of adequate control of expansion. It has also been found that certain unique materials can eliminate shrinkage in concrete due, it is theorized, to the release of entrapped gas from porous particulate materials upon adsorption of water from the cementitious system. Materials such as fluid coke, a combination of fluid coke and delayed coke, which are by-products of the petroleum industry, and porous particulate materials, such as so called industrial adsorbents, have been used with various types of cementitious mixtures to successfully inhibit shrinkage. See for example U.S. Pat. No. Re.26,597; U.S. Pat. Nos. 3,503,767; 3,519,449; 3,794,504; and 3,890,157.

The successful utilization of certain materials as shrinkage inhibitors in cementitious systems is unpredictable. For example, fluid coke is a carbonaceous material and therefore its success as a shrinkae inhibitor without having deleterious effects on the cementitious system is surprising. Thus, U.S. Pat. No. Re. 26,597 compares the effects of fluid coke, delayed coke and carbon black on grout shrinkage and concludes therefrom that no other type, i.e., other than fluid coke, of coke or carbon has the effect of expanding cement in a controlled matter. The patent also notes that coal clinkers may cause expansion but in a harmful and an uncontrolled amount with the expansion being related to the clinker sulfur content. While clinker and coke breeze have been added to cementitious systems as aggregates, "Concrete Technology", Vol. 1, John Wiley & Sons, New York, 1962, pp. 146–7, points out that the combustible matter, chiefly carbon, in these materials has lead to failures due to excessive expansion when they have been used as a concrete aggregate. The expanion may be exceptional and is apparently uncontrollable due to moisture movement on wetting which can result in shrinkage on drying.

U.S. Pat. No. 3,503,767 states that the amount of fluid coke required to eliminate shrinkage can be reduced if the particle size is fine. U.S. Pat. No. 3,519,449 finds that the amount can be reduced if the moisture content of the fluid coke is controlled and discloses drying the fluid coke to drive out substantially all the moisture. U.S. Pat. No. 3,890,157 discloses that an adsorbent-like porous particulate solid material, such as activated carbon, having entrapped gas within its pores and capable of adsorbing water and discharging the gas during cementitious system setting and hardening, counteracts shrinkage.

Carbonaceous materials have been added to cement compositions for very limited specific purposes in the oil well cementing environment. Thus, U.S. Pat. No. 2,609,882 discloses adding activated carbon to a cement composition for cementing oil wells in order to offset the deleterious effects, on the cement, of the oil well drilling mud additives. U.S. Pat. No. 3,376,146 discloses the addition of large amounts, at least 20 percent by weight or more, of carbon including ground lignite coal, bituminous coal, anthracite coal, graphite, petroleum coke and coke to a cement composition for cementing oil wells in order to provide a low density composition. Neither of the aforementioned patents dealing with oil well cementing recognizes any advantage or disadvantage of the added carbon material other than that described. For general application it is still believed that the addition of carbon such as coal and lignite is detrimental to concrete. See, for example, "Concrete Construction Handbook", Joseph J. Waddell, McGraw Hill, 2nd Ed., pp. 236–237 pointing out the limits for deleterious substances in fine and coarse aggregates for concrete and identifying coal and lignite as deleterious additives. The ACI (American Concrete Institute) suggests that aggregates meet ASTM Specification C33 which limits the maximum weight percent of coal or lignite to 1 percent or less in sand, for aggregate, when tested according to ASTM C123. According to ASTM C330-69, lightweight aggregates for structural concrete should not contain deleterious organic impurities.

SUMMARY OF TH INVENTION

It has been found that, unexpectedly, carbonaceous materials such as coal may be specifically processed to make them suitable for use as additives in cementitious systems and that when added to such systems they function to controllably inhibit or counteract the shrinkage that normally occurs upon setting and hardening.

The processing according to this invention not only "energizes"(that is, provides shrinkage inhibiting properties) carbonaceous materials, such as coal, previously unknown to possess advantageous characteristics useful for shrinkage inhibition, but also enhances the results obtained with a known carbonaceous shrinkage inhibitor such as fluid coke. The effective results vary from carbonaceous material to carbonaceous material and thus a high degree of control of shrinkage inhibition is obtained by this invention through the selection of the appropriately active material for a desired purpose. It is not known whether the variation in results among materials is due to the amount of carbon therein although there is a variation among the various types of coal which possess different amounts of carbon.

It is theorized, although I do not wish to be bound thereby, that the resulting shrinkage inhibition is due to the release of gas from the surface and interstices of the carbonaceous materials when added to the cementitious systems as particulate solids. Thus, the favorable results obtained may be due to the desorption of gasses held to active surfaces of the material. This release occurs when water from the cementitious system is adsorbed on the particle surface and replaces or displaces the gas. The precise manner in which this occurs, whether physical or chemical, is not fully understood. In particular, it is suprising that the carbonaceous materials possess these advantages and enhanced properties when specially processed according to this invention since coal has not been recognized as a shrinkage inhibitor when added to cement and furthermore has heretofore been considered to have a deleterious effect in normal applications.

Whether a physical or chemical change, or both, in the material occurs as a consequence of the special processing of this invention is not known and need not be the criteria, it being sufficient to point out the manner in which the carbonaceous material is processed to achieve the advantageous results obtained. The carbonaceous material is specially treated according to this invention by heating it, as, for example, in an oven, in the presence of air to high temperatures and its shrinkage inhibition properties are further enhanced by contact with steam at these high temperatures. The heating temperatures are substantially above those at which mere drying of the carboneous material occurs. According to ASTM D271 for sampling and analysis of coal and coke, total moisture is determined by drying at a temperature of 104-200° C (220-392° F). While some physical devolatilization apparently takes place, it cannot be said for certain that the treatment results in the occurrence of other calcining phenomenon such as pyrolysis, densifiction and crystallization.

The carbonaceous particulate material is generally added to the cement mixture at a time prior to the addition of water thereto and discharges its gas during setting and hardening of the cement mixture while in contact with water. A criteria for the material is that is release gas and therefore it must possess a sufficient degree of dryness so that it "holds" this gas and will absorb water to release the gas. The carbonaceous particulate materials are advantageous for use in a wide variety of cementitious systems having various setting times. Thus, they may be desirably utilized in cement types which are fast setting and in those which set in regular time. Consequently, by selecting the proper carbonaceous particulate material for a desired application, both the amount and time of shrinkage inhibition of the cementitious system can be much more effectively regulated.

Accordingly, a feature of this invention is the addition of carbonaceous materials to cementitious systems and the inhibition or counteraction of shrinkage in such cementitious systems through such addition. A further feature of this invention is the special processing of carbonaceous materials to make them useful or improve their use as shrinkage inhibitors in cementitious systems.

Surprisingly, the compressive strength of the cementitious system remains within acceptable limits, as defined either according to ASTM standards or according to industry accepted values for successful commercial use, with addition of the carbonaceous materials in amounts for effective shrinkage inhibition. Such advantageously occurs with the addition of unprocessed anthracite coal to a cementitious system including aggregate when the weight percent is maintained low, below 20 percent by weight of total solids.

Thus, another feature of this invention is the provision of a method and composition for inhibiting or counteracting shrinkage in cementitious systems in which anthracite coal is the effective additive.

An unexpected property of the carbonaceous materials added to cementitious systems according to this invention is the reduction of undesirable bleeding, i.e., sedimentation of solid material with a concomitant rise of water to the surface. Bleeding is particularly undesirable in applications such as the grouting of machinery and the like because it results in water-filled voids beneath baseplates and reinforcing bars. Upon drying, these voids remain and bonding strengths are reduced. The release of gases from the carbonaceous additives of the invention not only inhibits shrinkage but also serves to reduce the bleeding that would otherwise normally occur. This is an observable fact, although it is not understood whether it is due to the expulsion of water from the mass upon expansion of the cement against the restraining surface such as a baseplate or for other reasons.

Thus, it is a further feature of this invention to provide a method and composition for reducing bleeding in setting cementitious systems.

BRIEF DESCRIPTION OF THE DRAWINGS

The accompanying drawings present, in the form of graphs, examples of the shrinkage inhibition obtained in cementitious systems over a period of time of curing for various carbonaceous materials which have been specially processed according to this invention. Comparisons with the untreated material and a control, a cementitious system having no shrinkage inhibiting carbonaceous material present, are shown. One graph presents results obtained with processing of a non-carbonaceous shrinkage control additive. These graphs are illustration only of the results obtained herein and for exemplary purposes the following materials are shown:

FIG. 1 — Anthracite
FIG. 2 — Lignite
FIG. 3 — Fluid Coke
FIG. 4 — Delayed Coke
FIG. 5 — Activated Carbon
FIG. 6 — Activated Alumina
FIG. 7 — Bituminous Coal

DESCRIPTION OF THE PREFERRED EMBODIMENTS

The particulate material advantageously suitable for this invention is a carbonaceous material which has undergone special processing and treatment according to this invention. While the carbonaceous material may be one known to have shrinkage inhibition characteristics, such as fluid coke, which may be enhanced according to this invention, advantageously, the carbonaceous material is one which is not generally known to possess shrinkage inhibition properties of its own when added to cementitious systems in acceptable quantities, such as delayed coke, or which has even been considered deleterious when added to cement, such as coal. Fluid coke is made by a process described in U.S. Pat. No. 2,811,130 while delayed coke is described in U.S. Pat. No. 2,835,605. The effects of these materials as shrinkage inhibitors are set forth in U.S. Pat. No. Re.26,597. That patent discloses that while fluid coke is advantageously utilized in cementitious compositions to inhibit shrinkage, delyaed coke, although having a chemical composition very close to fluid coke, does not produce expansion when added in acceptable quantities but behave in the same manner as does an inert additive, such as sand. In addition, it is described in U.S. Pat. No. Re.26,597, that carbon black, believed to be a highly surface active material, does not cause expansion although it is readily wetted by water and might be expected to expand in view of the results with fluid coke. Thus, the results herein are surprising and unexpected.

Coal is generally classified based on is value as fuel, that is, on the percentage of carbon present and the condition of the carbon. Part of the carbon in coal is fixed and cannot be driven off by heating in a retort while part of it is combined with hydrogen and nitrogen as volatile hydrocarbon compounds which can be vaporized. The proportion of the fixed carbon to the volatile hydrocarbons in coal is called its fuel ratio and on this basis the type distinctions usually made are between lignite, bituminous, semi-bituminous, semi-anthracite and anthracite coal, in order of increasing carbon content and increasing fuel ratio. Lignite or brown coal, is brown-black in color and has a specific gravity of 0.5 to 1.5 . Bituminous or soft coal is black and has a specific gravity of 1.25 to 1.4. Anthracite, also called hard coal, is black with a specific gravity of 1.3 to 1.75 . Herein, terms such as bituminous and anthracite refer also to the "semi" form.

Selection of a processed carbonaceous particulate additive having substantially uniform or a selected range of particle sizes will aid in providing a controlled shrinkage inhibitor over an extended period during setting and hardening of the cementitious system for various purposes. Since the materials are all carbonaceous, they are compatible for blending for use. It will be understood by those skilled in the art that the selection of a specific carbonaceous material, a particular treatment process therefor and particle sizes will be dependent upon the cementitious system used and the application desired. The proper selection and amount to be added can be readily made based on routine observation and measurement of those parameters described below, according to the teaching herein.

In carrying out the method of this invention, the proper amount of processed carbonaceous material may be added to and mixed with cement or any type of cement mixture at any time prior to or during the addition of water to form aqueous cement mixtures. For example, in preparing grout or mortar, the additive may be mixed with cement or cement and fine aggregates to form a dry cement mixture which is subsequently mixed with the desired amount of water to form grout or mortar. Similarly, in preparing ready-mixed concrete, the additive may be mixed with the cement or with the cement and aggregate to form a dry mixture which is then used to form the ready-mixed concrete either in a stationary or in a truck mixer. On the other hand, it may be advantageous to mix all the ingredients, including the additive, in the stationary and/or in the truck mixer to form the ready-mix concrete.

Since the amount of additive to be used in any cementitious system can be best calculated based on the amount of cement in the system, it is advantageous to incorporate the additive directly in the cement prior to its shipment to the use.

Further to illustrate this invention, specific examples are described hereinbelow. In these examples, the performance of the additive was judged by the expansion and contraction of the cementitious mold in a 3½ inch deep casting and with approximately 10% of exposed surface. The expansion and contraction of the casting was determined by the vertical movement of the top surface. For the purpose of higher accuracy, a light test, substantially in accordance with ASTM Standard C 827-75T for early volume change of cementitious mixtures, was used to measure the movement of the top surface. The test consists of using a focused light beam to project a shadow of the top surface onto a screen equipped with a vertical graduation in "inch" units. The magnification is 88 times. The movement of the top surface on the screen is recorded in inches at frequent intervals for each casting until final set, which usually takes about 3 to 4 hours with longer setting materials and less than 60 minutes with a fast setting cementitious composition.

To facilitate the detection of the movement of the top surface a sphere was placed on top of the surface and the expansion or contraction of the casting was determined by the movement of the apex of the shadow projected on the screen. A thin layer of oil was added on top of the cast cementitious material in the mold to prevent evaporation for setting under a "no evaporation" condition.

In each example run of Example 1, a cementitious system was prepared by mixing, in weight ratios, 42.5 parts Type I cement, 50 parts and 7.5 parts carbonaceous additive, the latter processed according to the invention by heating to 900°, 1300° and 1500° F and also by such heating followed by spraying with water at those temperatures resulting in steam treatment. The treatment times are not critical, 1 to 2 hours heating being sufficient. Runs with unprocessed material, as received and as dried at 250° F, were also made to serve as a control for comparison purposes. In addition, example runs using activated alumina in place of the carbonaceous additive were also made to determine the effect of the special processing of this invention on a non-carbonaceous material. Each of the compositions was thoroughly mixed with water, about 9 quarts per 100 pounds of mix, cast a described above and the expansion or contractions observed.

EXAMPLE 1—A through H

The carbonaceous materials, ground to pass a No. 16 sieve and added in the proportions given above, were:
A. Fluid coke
B. Delayed coke
C. Anthracite coal
D. Ft. Union lignite coal
E. Pittsburg seam —bituminous coal
F. Activated carbon The results are set forth in Table 1 showing the light test measurements in inch units resulting from use of carbonaceous materials having undergone different processing treatments according to this invention and demonstrate the efficiency of these materials as shrinkage inhibitors when so processed. The results using (G) activated alumina, a non-carbonaceous shrinkage control additive, are also shown.

ground anthracite coal to cement ramined at close to 2.75 parts by weight in most instances for each composition. The water to cement ratio remained at 0.67 except

TABLE 1

| Shrinkage Control Additive Material | Values in Light Test Measurement Inch Units | | | | | | |
|---|---|---|---|---|---|---|---|
| | A. Fluid Coke | B. Delayed Coke | C. Anthracite | D. Ft. Union Lignite | E. Pittsburgh Seam-Soft Coal | F. Activated Carbon | G. Activated Alumina |
| As received | +10.6 | −2.5 | No change | −0.6 | −2.3 | −0.1 | −1.0* |
| Dried at 250° F | +9.4 | No change | +9.5 | +2 | −1.3 | +2.4* | −2.4 |
| Dry Heat Treatment: 900° F | +10 | −0.38 | +8.3 | +8* | −1.8 | −0.5*** | −1.8** |
| 1300° F | +16 | +8.8 | +14 | +7.3 | +7.8 | −1.6 | −2.2 |
| 1500° F | +6 | +4.3 | +15.6 | +10 | +7.4 | — | −2.7 |
| Steam Heat Treatment 900° F | +9.3 | −1.3 | +6.5 | +4.5* | +2.6 | +2.4** | −1.8 |
| 1300° F Steam | +9 | +7.9 | +12 | +5.8 | +24.2 | +2.1 | −2.5 |
| 1500° F Steam | +9 | +7.6 | +19.5 | +11 | +5.9 | +2.1 | −1.8 |

*10 quarts water used,
**10.5 qts.
***11 qts.

The dry heat treatment comprises heating the carbonaceous material or other non-shrink additive or control in an electric oven such as a Type 1400 Furnace made by Thermolyne of Dubuque, Iowa having resistance heaters built into the walls controlled by on-off cycling timers to the temperature desired. Heating occurs in a closed system in which there is a sparse presence of air due to slight leakage around the oven door, for example the seal is not so tight that a paper sheet cannot be drawn therethrough. However, it is theorized that the internal oven atmosphere soon contains carbon monoxide and dioxide and less oxygen due to oxidation of the carbon. Moreover, not only does the presence of air not adversely affect the results of the processes but actually enhances them as described in greater detail below. Steam heat treatment comprises the dry heating followed by spraying with a water vapor jet forming steam at that temperature.

In contrast to the results set forth in Table 1, an aqueous cement mixture identical to the above but with 7.5 parts (H) sand added, as a control, in place of the carbonaceous material underwent a shrinkage measured, in the identical manner as above, as −3.375 inches. The activated alumina, while a shrinkage inhibitor in its untreated state, does not improve in effectiveness when undergoing processing of the invention is particularly advantageous for carbonaceous materials.

Although it is still widely believed that the addition of carbonaceous material such as coal and lignite is undesirable in concrete, I have found that the compressive strengths of exemplary compositions prepared in accordance with the procedures described above still fall within acceptable limits.

EXAMPLE 2

Compressive strengths of various cementitious systems containing cement sold as Portland cement Type I and ground anthracite coal in amounts ranging from 0 to 35% by weight of the cement were tested by a procedure in general accordance with ASTM 109-75, the standard method of test for "Compressive Strength of Hydraulic Cement Mortars (Using 2-in. or 50-mm Cube Specimens)". The standard proportions are one part of cement to 2.75 parts of graded natural silica sand from Ottawa, Ill, and a water cement ratio of 0.485. In view of the unavailability of Ottawa sand, Holliston sand was used. Ground anthracite coal was substituted for an equal weight of sand so that the ratio of sand plus where it was necessary to change it for good workability for each composition tested. The compressive strengths were measured after three days.

The results are presented in Table 2. When these results are plotted on a graph of strength versus percent anthracite coal, one obtains a curve showing generally that Portland cement Type I increased in strength in three days when from 0 to 25% addition the strength begins to fall back to approximately that of the sand-cement mixture without the addition of ground anthracite coal. Above 25% ground anthracite coal addition the three day strength decreases even further. Also at this level of coal, workability of the mix and reproducibility of results becomes difficult, requiring the addition of more water and a concomitant loss in strength. It was also observed that at approximately 10% ground anthracite coal addition an apparent high early strength was obtained compared to the other additive amounts.

The results are quite surprising and unexpected in the range of addition of anthracite coal in amounts below 25% by weight of cement, since it is widely believed that the addition of coal is undesirable in concrete because of among other reasons, the adverse affect on compressive strength. The decrease in compressive strength shown about 25% ground anthracite coal addition is in accordance withwhat one would normally expect. In fact, above this percentage, at 35% ground anthracite coal, the three day compressive strength falls below 1800 psi, the standard for Type I cement according to ASTM designation C 150-74.

EXAMPLE 3

Further compressive strength tests of cementitious compositions containing ground anthracite coal were made using a Type III cement and sand composition wherein the cement comprises 80 percent, by weight on a dry basis, of the composition and the anthracite coal and sand varied inversely from 0 to 20 percent, by weight of total solids on a dry basis.

TABLE 2

| SAND PLUS ANTHRACITE COAL TO CEMENT RATIO | WATER TO CEMENT RATIO | ANTHRACITE COAL*, WEIGHT % OF CEMENT | 3-DAY COMPRESSIVE STRENGTH PSI |
|---|---|---|---|
| 2.75 | .67 | 0 | 2320 |
| 2.75 | .67 | 0 | 2275 |
| 2.74 | .67 | 1 | 2175 |
| 2.73 | .67 | 2.5 | 2375 |

TABLE 2-continued

| SAND PLUS ANTHRACITE COAL TO CEMENT RATIO | WATER TO CEMENT RATIO | ANTHRACITE COAL*, WEIGHT % OF CEMENT | 3-DAY COMPRESSIVE STRENGTH PSI |
|---|---|---|---|
| 2.71 | .67 | 5 | 2500 |
| 2.70 | .67 | 7.5 | 2400 |
| 2.68 | .67 | 10 | 2830 |
| 2.65 | .67 | 15 | 2735 |
| 2.61 | .67 | 20 | 2790 |
| 2.57 | .67 | 25 | 2875 |
| 2.49 | .67 | 35 | 1789 |
| 2.75 | .59 | 0 | 2000 |
| 3.16 | .59 | 0 | 1650 |
| 2.67 | .67 | 10 | 2610 |
| 3.16 | .59 | 11 | 1888 |
| 3.16 | .59 | 11 | 2162 |
| 2.60 | .67 | 20 | 2380 |
| 2.57 | .67 | 25 | 2290 |
| 2.53 | .67 | 30 | 2050 |
| 3.17 | .59 | 0 | 1990 |
| 3.17 | .73 | 0 | 1590 |
| 3.69 | .59 | 12.5 | 1630 |
| 3.69 | .59 | 12.5 | 1820 |
| 4.00 | .59 | 20 | 1740 |
| 4.66 | .67 | 36 | 865 |
| 4.66 | 1.0 | 36 | 810 |

* Pass 20 mesh retained on 100 mesh
Note: The first 11 runs represent cement from one bag, the remainder from a different bag.

Water was added in an amount of 26.8 perccent of the mix or 33.5 percent of the cement. The density of the cast cubes and expansion-contraction, according to the light test (88× magnification), were also measured. The results, set forth in Table 3, show that compressive strength generally decreases as the amount of ground anthracite coal approaches 20 percent by weight of total solids.

For example, at the 4 and 6% levels of anthracite coal addition, adequate to just compensate shrinkage or cause slight expansion, compressive strengths of 6375 and 6075 psi are obtained. However, at 20% addition the strength decreases to 5125 psi, a drop of approximately 20 percent. Such a percentage drop in strength would be significant and unacceptable in a normal structural cementitious composition, especially where the strength already undergoes a decrease through the addition of anthracite coal at low levels. These further decreases in strength are not tolerable and therefore anthracite coal addition above 20% of total solids is not satisfactory for normal structural use. Above 20 percent, the strength decreases even further and such a composition is also unacceptable for normal structural use in practical commercial applications. Thus, a test at 30% anthracite coal and 70% cement showed a cube strength of 4275 psi, about 30 percent less than the strength of 6075 psi obtained with the 6 percent anthracite coal composition including sand and cement described above. While a strong mix is illustrated because of the high proportion of cement, a typical structural composition would employ less cement and more sand and aggregate and have lower strengths. In such a structural composition a 30% decrease in strength would be unacceptable.

At 30% anthracite coal the expansion is +24.2 inches and the cube density is 14.4 lbs/gallon. Table 3 indicates that densities above 15 lbs/gallon are preferred because of the overall benefit and balance in properties at the anthracite coal levels to which this corresponds. Table 3 also shows the apparent high early strength development obtained at 10% anthracite coal addition.

TABLE 3

| Ground Anthracite Coal %, wt. total solids | Sand %, wt. total solids | One-day* Strength psi | Expansion-Contraction "inch" units | Cube Density lbs./gallon |
|---|---|---|---|---|
| 20 | 0 | 5125 | +10.4 | 15.3 |
| 15 | 5 | 5475 | + 7.5 | 15.7 |
| 10 | 10 | 5938 | + 5.7 | 16.2 |
| 8 | 12 | 5575 | + 5.3 | 16.3 |
| 6 | 14 | 6075 | + 3.2 | 16.6 |
| 4 | 16 | 6375 | − 0.1 | 16.9 |
| 2 | 18 | 7525 | − 3 | 17.2 |
| 0 | 20 | 8212 | − 5 | 17.3 |

EXAMPLE 4

Selected samples of the compositions of Example 1 were subjected to cube strength tests at 7 and 14 days. The results, presented in Table 4, show that compressive strength decreased only approximately 10 percent when anthracite coal was added to inhibit shrinkage. That is, there was no substantial, commercially unacceptable, decrease in strength for this composition in which shrinkage was eliminated. The bituminous coal shows a greater decrease. This decrease can be reduced by reducing the amount of additive to that just sufficient to eliminate shrinkage and not cause expansion.

TABLE 4

| ADDITIVE | 7-DAY STRENGTH, psi | 14-DAY STRENGTH, psi |
|---|---|---|
| None | 5225 | 5775** |
| Anthracite as received | 4750 | 5200 |
| Anthracite dried at 250° F | 4000 | 4700 |
| Ft. Union Lignite dried at 250° F | 1800 | 2280 |
| Ft. Union Lignite* 900° F | 3600 | 4250 |

*10 quarts water used
**15 day measurement

EXAMPLE 5

In this example, the effect of heating in the presence of an increased amount of air was ascertained. Heating of (B) delayed coke and (C) anthracite coal took place as previously described with the exception that instead of being shut, the oven door was permitted to remain open ¼ inch. Cementitious systems were prepared and light test measurements made as described for Example 1. The cementitious systems containing anthracite coal heated at 1300° F in the presence of this increased air expands +13.2 inch units as compared to +14 inch units, shown in Table 1, when heated in the closed system or sparse air, no significant change. However, the cementitious system containing delayed coke heated at 1300° F in increased air expanded +17.5 inch unit compared to only +8.8 inch units, shown in Table 1, when heated in sparse air, a highly effective energization of this material as a shrinkage inhibiting agent.

As an aid to a better understanding of the results obtained with the special processing of this invention, certain results selected merely as exemplary are seet forth in illustrative graph form in FIGS. 1 through 7.

FIGS. 1 through 7 present the expansion or shrinkage reading obtained according to the light test described above, plotted as the ordinate, as a function of curing time, in minutes after casting, of the cementitious system plotted on the abscissa. The legends appearing on the individual plot lines are explanatory of the treatment which the material has undergone. The term "dried" refers to heating to 250° F only, to remove moisture.

In interpreting the graphs of FIGS. 1 through 7, as well as the results presented in Table 1, it must be remembered that the expansion or shrinkage is presented in inch units which correspond to graduations on the chart used in the light test to reflect changes in elevations of the cast surfaces. This test is highly sensitive and magnifies those changes 88 times. As a consequence, differences of one or two units may not be particularly significant in comparing results of various treatments or various materials.

Nevertheless, FIGS. 1 through 5 and 7 show the controllability of shrinkage inhibitors, in some cases actual expansion, through the appropriate selection of materials processed according to this invention. Many combinations are possible to control not only the amount of shrinkage inhibition or expansion but also the time at which it is initiated and the period for which it lasts. This is advantageous in view of the many different types of cements with varying characteristics such as setting time. For example, the plotted lines with arrows at their ends signify that the material remained effective to cause expansion or shrinkage inhibition beyond the abscissa limit. That is, entrapped gas continues to be released.

The results presented in FIGS. 1 through 5 and 7 are unexpected and unpredictable. Activated alumina, FIG. 6, is not enhanced by the special processing. Also, as can be seen, even within the group of carbonaceous materials, the results vary. These are described further with reference to the specific material used.

The foregoing demonstrates that carbonaceous materials can be rendered effective cementitious system shrinkage inhibitors by treatment with heat and with heat plus steam or water spraying. Where the carbonaceous material already possesses shrinkage inhibition propensities, these are vastly enhanced by the treatment of this invention. This is surprising and unexpected since there does not appear to be any physical similarity between the various successful carbonaceous materials when in an untreated state. Thus, fluid coke has a hailstone-like, built-up concentric sphere structure resulting from an accretion of blisters while delayed coke is sponge-like, and not layered or spherical. Coal, however, is different from both fluid coke and delayed coke, being layered or laminar in structure. Chemically, the materials may be considered similar to the extent that they all contain carbon. Yet, all function differently, although successfully, when treated. Untreated, the shrinkage inhibiting behavior is radically different among the materials.

EXAMPLE 6

In order to ascertain whether adsorbent-like surface area properties were responsible for the surprising behavior of the carbonaceous materials of this invention, samples of the following carbonaceous materials were submitted to American Instrument Company, Inc., Silver Spring, Md. for a determination of surface area and porosity:

A. Anthracite Coal — ground to pass a 20 mesh sieve
B. Delayed Coke — heated to 1300° F
C. Delayed Coke — heated to 900° F and treated with steam
D. Fluid Coke — as received from supplier The results are reported in Table 5.

TABLE 5

| | | Surface Area* $m^2/g$ | Porosity cc/gram at** 60,000 psi Mercury |
|---|---|---|---|
| A. | Anthracite Coal - ground | 2.1 | 0.507 |
| B. | Delayed Coke - heat | 3.2 | 0.276 |
| C. | Delayed Coke - heat and steam | 15.6 | 0.096 |
| D. | Fluid Coke - as is | 11.1 | 0.114 |

*Nitrogen Adsorption
**Mercury Porosimetry

In contrast to the above listed values, technical handbooks provide values for so-called adsorbents which show that these materials have a surface area in excess of $100 m^2/g$. For example, a carbonaceous absorbent is activated carbon. Various properties of adsorbent carbon, such as internal porosity, void fraction and surface area, are presented in Table A-13 of *Chemical and Process Technology Encyclopedia,* D. M. Considine, Ed-in-Chief, McGraw-Hill, Inc. (1974) and show that the porosity generally exceeds 50 percent while the surface area ranges from 625 to 1,400 $m^2/g$.

Although activated alumina and activated carbon are adsorbent-like materials and are capable of functioning as shrinkage inhibitors in cementitious systems, see, for example, U.S. Pat. No. 3,890,157 while fluid coke, not an adsorbent, also possesses this beneficial ability, see, for example, U.S. Pat. No. 3,234,035, it is surprising and unexpected that the special processing according to this invention results in either enhancing, or not significantly adversely affecting, the ability of fluid coke and activated carbon to inhibit shrinkage since such ability of activated alumina is adversely affected by such special processing as shown by FIG. 6.

The shrinkage inhibition properties of fluid coke increase with heating, a heating which is more than merely that which is sufficient to drive off water for the purpose of driving the material.

Delayed coke as received from the refinery is ineffective for shrinkage inhibition when added to cementitious systems in acceptable quantities. Thus, it has been found that delayed coke will result in expansion when added to cementitious systems only in an amount approximately 10 times that amount normally required to achieve the same result with fluid coke.

Yet, while delayed coke as received from the refinery is ineffective in acceptable quantities, it becomes equal to or superior to fluid coke when it is treated by heating and subjecting it to a fine spray of water or steam. Anthracite coal provides a benefit when used even as received, is more effective when simply dried and becomes a superior shrinkage inhibitor when heated and contacted with a fine spray of water. The ability of anthracite coal to inhibit shrinkage in its natural state was verified by observing that ground anthracite coal released gas when placed in water. Also surprising is the fact, as found by me, that the addition of 1% anthracite coal which has been ground and treated by heating to 1500° F and steam spraying is more effective, as an expansion agent in a cementitious system, than is fluid coke added in the amount of 1%, although both are satisfactory. Soft coal is essentially ineffective as received but becomes effective when treated. In surprising contract lignite provides some apparent benefit in its untreated state which is enhanced upon treatment. These variations make possible selected combinations of the different carbonaceous materials to yield an additive with the desired degree of shrinkage compensating properties for particular requirements. Consequently, a greater degree of selectivity and control, based on differing rates of expansion of volumes of expansion, is now possible. Other carbonaceous materials, such as cannel coal, charcoal and the like are contemplated for use and treatment herein.

Moreover, the compressive strengths obtained are unexpectedly satisfactory in view of the belief in the art that coals adversely affected the same in cement. Here, the benefit of shrinkage inhibition far outweighs any change that necessarily accompanies expansion and/or the addition of a soft material to the cement.

The surprising ability of the carbonaceous materials which inhibit shrinkage by gas release to also minimize bleeding in cementitious systems is illustrated by Example 7.

While certain examples have been presented herein to illustrate the invention, it will be understood by those skilled in the art that these examples are not limiting. Thus, the invention is applicable to cementitious systems generally and may be utilized where a liquid possessing the ability to harden cementitious materials is one other than water provided that a means, for example such liquid or another liquid or means, for releasing gas from the shrinkage inhibiting carbonaceous additive is present. Also, the cementitious system may contain other additives normally employed in the industry such as retarders, water reducing agents, accelertors and the like provided their use is not incompatible with the carbonaceous additive and the shrinkage inhibition result desired.

I claim:

1. A method for inhibiting the shrinkage of an aqueous hydraulic cementitious system prior to hardening comprising selecting a particulate carbonaceous material from the group consisting of delayed coke and naturally occurring coal, treating the material by heating it to a temperature substantially in excess of that temperature at which moisture is driven out of the material, incorporating the treated particulate carbonaceous material in the cementitious system, in an amount effective to counteract the shrinkage tendency of the cementitious system, the carbonaceous material being one which when so treated is effective to inhibit shrinkage by causing expansion of the system compared to no incorporation of carbonaceous material.

2. A method as claimed in claim 1 wherein the heating temperature is in excess of that temperature at which devolatilization of constituents in the carbonaceous material occurs.

3. A method as claimed in claim 1 wherein the heating is primarily carried out in an essentially closed system.

4. A method as claimed in claim 1 wherein the heating is carried out in the presence of air.

5. A method as claimed in claim 1 wherein the heating temperature is in excess of 900° F.

6. A method as claimed in claim 1 further including following the heating by contacting the carbonaceous material with a water spray at the heating temperature.

7. A method as claimed in claim 1 wherein the naturally occurring carbonaceous material is selected from the group consisting of anthracite coal, bituminous coal and lignite coal or combinations of the same.

8. In a cementitious composition for forming an aqueous hydraulic cementitious system containing solids including aggregate for structural use, the improvement resulting in inhibition of shrinkage of the system while maintaining sufficient compressive strength for structural use comprising the inclusion therein in addition to the aggregate of particulate anthracite coal in an amount less than about 20 percent, by weight, of the total solids in the system.

9. In a cementitious composition for forming an aqueous hydraulic cementitious system, the improvement comprising the inclusion therein, in an amount effective to inhibit the shrinkage of the system prior to hardening, of a particulate carbonaceous material selected from the group consisting of delayed coke and naturally occurring carbon-containing materials specially processed by heating the material to a temperature substantially in excess of that temperature at which the material is merely dried, the carbonaceous material being one which when so processed is effective to inhibit shrinkage by causing expansion of the system compared to no inclusion of carbonaceous material.

10. A composition as claimed in claim 9 wherein the carbonaceous material has been water sprayed at the heating temperature.

11. A composition as claimed in claim 19 wherein the naturally occurring carbonaceous material is one selected from the group consisting of anthracite coal, bituminous coal, and lignite coal or combinations of the same.

12. A method for inhibiting the shrinkage of an aqueous hydraulic cementitious system prior to hardening comprising incorporating particulate anthracite coal in the cementitious system, in an amount effective to counteract the shrinkage tendency of the cementitious system, but less than about 25 percent, by weight, of the cement in the system, causing the system to expand, as compared to no such corporation, while allowing it to set and harden.

13. A method for inhibiting the shrinkage of an aqueous hydraulic cementitious system prior to hardening comprising selecting a particulate naturally occurring carbonaceous material, incorporating the particulate carbonaceous material in the cementitious system, in an amount effective to counteract the shrinkage tendancy of the cementitious system but ineffective to reduce the compressive strength of the system appreciably blow that strength obtained without the particulate carbonaceous material, as measured according to ASTM C 150-74, the carbonaceous material being one which is effective to inhibit shrinkage by causing expansion of the system compared to no incorporation of carbonaceous material.

14. In a cementitious composition for forming an aqueous hydraulic cementitious system, the improvement comprising the inclusion therein, in an amount effective to inhibit the shrinkage of the system prior to hardening but ineffective to appreciably reduce the compressive strength of the system, as measured by ASTM C 150-74, of a particulate naturally occurring carbonaceous material, the carbonaceous material being one which is effective to inhibit shrinkage by causing expansion of the system compared to no inclusion of carbonaceous material.

15. A composition as claimed in claim 14 wherein the naturally occurring carbonaceous material is anthracite coal present in an amount such that the density of the system remains greater than 15 pounds per gallon.

* * * * *

UNITED STATES PATENT OFFICE
CERTIFICATE OF CORRECTION

PATENT NO. : 4,043,828
DATED : August 23, 1977
INVENTOR(S) : Robert W. Gaines

It is certified that error appears in the above-identified patent and that said Letters Patent are hereby corrected as shown below:

Col. 1, l. 27, "cementtitious" should read--cementitious--; l. 33, "encompass" should read--encompasses--; l. 60, "shrinkae" should read--shrinkage--; l. 67, "matter" should read--manner--; Col. 2, l. 9, "expanion" should read-- expansion--; l. 18, the period after the number 3 should be a comma; Col. 3, l. 46, "densifiction" should read--densification--; l. 51, "is", second occurrence, should read--it--; Col. 4, l. 31, "cement" should read--system--; Col. 5, l. 11, "delyaed" should read--delayed--; l. 14, "have" should read--haves--; l. 42, "inhibitor" should read--inhibition--; Col. 6, l. 11, after "cementitious" insert--system as soon as it was mixed with water and cast in a cylindrical--; Col. 7, l. 46, after "undergoing" insert--the special--and after "processing" insert--herein suggesting that the special processing--; Col. 8, l. 1, "ramined" should read--remained--; l. 28, after "25%" insert--ground anthracite was added thereto while at 25%--; l. 47, "withwhat" should read--with what--; Col. 10, l. 61, "unit" should read--units--; l. 67, "seet" should read--set--; Col. 11, l. 20, "inhibitors" should read--inhibition--; Col. 12, l. 21, "absorbent" should read--adsorbent--; l. 44, "driving" should read--drying--; Col. 13, l. 2, "contract" should read--contrast--; l. 19-22, should be deleted; l. 34, "accelertors" should read--accelerators--; Col. 14, Claim 11, l. 25, "19" should read--9--; Claim 12, l. 37, "corporation" should read--incorporation-- and Claim 13, l. 46, "blow" should read--below--.

UNITED STATES PATENT OFFICE
CERTIFICATE OF CORRECTION

Patent No. 4,043,828                    Dated August 23, 1977

Inventor(s)  Robert W. Gaines

It is certified that error appears in the above-identified patent and that said Letters Patent are hereby corrected as shown below:

Column 6, line 38, after "50 parts" insert -- sand --.

Column 13, line 9, "of", second occurrence, should read -- and --.

Signed and Sealed this

Twenty-first Day of March 1978

[SEAL]

Attest:

RUTH C. MASON
Attesting Officer

LUTRELLE F. PARKER
Acting Commissioner of Patents and Trademarks